United States Patent
Ekanadham et al.

(10) Patent No.: US 10,936,320 B1
(45) Date of Patent: Mar. 2, 2021

(54) EFFICIENT PERFORMANCE OF INNER LOOPS ON A MULTI-LANE PROCESSOR

(71) Applicant: International Business Machines Corporation, Armonk, NY (US)

(72) Inventors: Kattamuri Ekanadham, Mohegan Lake, NY (US); Manoj Kumar, Yorktown Heights, NY (US); Jose E. Moreira, Irvington, NY (US); Pratap C. Pattnaik, Yorktown Heights, NY (US); Jessica Hui-Chun Tseng, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/543,540

(22) Filed: Aug. 17, 2019

(51) Int. Cl.
*G06F 8/41* (2018.01)
*G06F 9/38* (2018.01)
*G06F 9/30* (2018.01)

(52) U.S. Cl.
CPC .......... *G06F 9/3851* (2013.01); *G06F 9/3012* (2013.01); *G06F 9/30065* (2013.01); *G06F 9/3871* (2013.01)

(58) Field of Classification Search
None
See application file for complete search history.

(56) References Cited

U.S. PATENT DOCUMENTS

| | | | | |
|---|---|---|---|---|
| 5,287,509 A * | 2/1994 | Yamada | ................. | G06F 8/452 718/107 |
| 7,395,419 B1 * | 7/2008 | Gonion | ................... | G06F 8/443 712/241 |
| 8,438,370 B1 | 5/2013 | Budge | | |
| 9,898,297 B2 | 2/2018 | Vorbach et al. | | |
| 2011/0320765 A1 * | 12/2011 | Karkhanis | .......... | G06F 9/30141 712/7 |
| 2013/0125097 A1 * | 5/2013 | Ebcioglu | ............ | G06F 12/0875 717/136 |
| 2013/0125105 A1 * | 5/2013 | Gao | ......................... | G06F 8/51 717/160 |

(Continued)

OTHER PUBLICATIONS

Srinath et al., "Architectural Specialization for Inter-Iteration Loop Dependence Patterns", Proceedings of the 47th Int'l Symp. on Microarchitecture, Dec. 2014, pp. 1-13.

(Continued)

*Primary Examiner* — Hyun Nam
(74) *Attorney, Agent, or Firm* — Daniel Morris; Otterstedt, Wallace & Kammer, LLP

(57) ABSTRACT

A processor core and methods for managing the processor core. The processor core comprises of a plurality of lanes, each lane comprising a copy of a register file logically shared across the plurality lanes and a plurality of functional units, at least two of the functional units sharing a common cache and a common control unit, where the common control unit concurrently dispatches multiple consecutive instances of an instruction corresponding to multiple successive instances of an inner loop to the plurality of functional units of at least a proper subset of the plurality of lanes; and one or more registers of each copy of the register file, each register being configurable to write a data result from at least one of the functional units to a register in a lane-local mode, a lane-forward mode, and a normal mode.

20 Claims, 7 Drawing Sheets

(56) References Cited

U.S. PATENT DOCUMENTS

| | | | | |
|---|---|---|---|---|
| 2015/0106798 A1* | 4/2015 | Steiner | ................... | G06F 8/443 |
| | | | | 717/160 |
| 2016/0342888 A1* | 11/2016 | Yang | ................. | G06K 9/00986 |
| 2016/0357703 A1* | 12/2016 | Suzuki | ................ | G06F 13/1663 |
| 2018/0181398 A1 | 6/2018 | Scherbinin et al. | | |

OTHER PUBLICATIONS

Krishnan, et al. Hardware and software support for speculative execution of sequential binaries on a chip-multiprocessor. In International Conference on Supercomputing Julu, 1998, (pp. 85-92).

Krishnan et al., "A Chip-Multiprocessor Architecture with Speculative Multithreading", IEEE Transactions on computers, vol. 48, No. 9, Sep. 1999, pp. 866-880.

Manoj Kumar et al., unpublished U.S. Appl. No. 16/205,208, filed Nov. 29, 2018, Reformatting Matrices to Improve Computing Efficiency, p. 1-31 Plus 7 Sheets Drawings.

* cited by examiner

```
double innerP (double sum, double *A,
       double *B, uint32_t N) {                    ⟵ 200
    uint32_t i ;
    for (i=0; i < N; i++) {
        sum += A[i] * B[i];
    }
    return (sum);
}                                                  ⟵ 204
innerP:
    cmpdi 0,6,0
    beqlr 0
    addi 6,6,-1
    li 9,0
    rldicl 6,6,0,32
    addi 6,6,1
    mtctr 6
    .p2align 5,,31
.L3:
    lfdx 12,4,9          // R12 ← A[i]
    lfdx 0,5,9           // R0 ← B[i]
    addi 9,9,8
    fmadd 1,12,0,1       // R1 += A[i] * B[i]
    bdnz .L3
    blr
```

EFFICIENT PERFORMANCE OF INNER LOOPS ON A MULTI-LANE PROCESSOR

BACKGROUND

The present invention relates to the electrical, electronic and computer arts, and more specifically, to efficiently performing inner loops of a program on a multi-lane processor.

Multi-lane processors and processor cores incorporate functional units that are capable of operating in parallel on different, or the same, data sets. In order to improve the single thread performance of a processor, the processor industry is continuously adding a large number of heterogeneous functional units to a processor core and creating a large number of homogeneous lanes per core. Architecturally, the lanes share a register file. For read performance reasons, a copy of the register file is usually maintained for each lane. These trends will lead to two bottlenecks, however: 1) the front-end will likely become a bottleneck as its performance will scale slower than the ability to add multiple lanes; and 2) the register file shared across functional units and cores will become a bottleneck. While multiple copies of the register file will alleviate read bottlenecks, the write bottlenecks will remain. For example, in order to keep the register state consistent in each lane, a write by any lane to a register of the register file is broadcast to all other lanes. This is often the source of performance bottlenecks, expensive hardware, and the like.

For example, if the processor has n lanes and each lane performs x register reads and y register writes per cycle, then in the aforementioned setup of register file where each lane has its own copy, each copy will see x register reads and n×y register writes per cycle. The writes from all lanes are performed on each copy of the register file.

SUMMARY

Principles of the invention provide techniques for efficiently performing inner loops of a program on multi-lane processors. In one aspect, a processor core, according to an aspect of the invention, comprises a plurality of lanes, each lane comprising a copy of a register file logically shared across the plurality lanes and a plurality of functional units, at least two of the functional units sharing a common cache and a common control unit, where: the common control unit concurrently dispatches multiple consecutive instances of an instruction corresponding to multiple successive instances of an inner loop to the plurality of functional units of at least a proper subset of the plurality of lanes; and one or more registers of each copy of the register file, each register being configurable to write a data result from at least one of the functional units to a register of a same lane in a lane-local mode, to write the data result to a register of a next lane in a lane-forward mode, and to write a data result to corresponding registers of all of the lanes of the proper subset of the plurality of lanes in a normal mode.

In one aspect, a method of performing an inner loop on a processor core comprises: dispatching an instruction simultaneously to one or more functional units of at least a proper subset of lanes of the processor core, each lane having a copy of a register file logically shared across the plurality of lanes; and configuring one or more registers of each copy of the register file to write a data result from at least one functional unit to one of the registers of a same lane in a lane-local mode, to write the data result to a register of a next lane in a lane-forward mode, or to write the data result to corresponding registers of all lanes of the proper subset of the lanes in a normal mode.

In one aspect, a method of determining a count of loop instances present in an instruction buffer comprises: locating a first instruction address of a first branch instruction in the instruction buffer; locating an address of a next matching instruction in the instruction buffer; establishing a loop length as a difference between the first instruction address and the address of the next matching instruction; counting instructions in one of the loop instances (the counting of instructions comprising: making a copy of the instruction buffer; shifting down one or more instructions of the copy by a loop length; comparing instruction addresses of instructions in the instruction buffer with the shifted instruction addresses in the shifted copy; labeling matches from the comparison as a one and labeling mismatches from the comparison as a zero; and counting contiguous strings of ones in the labels starting from a location of a first branch instruction in the instruction buffer); dividing the count of instructions in the loop instance by the loop length and adding 1 to the result to compute the count of loop instances; and configuring a lane of a processor core for each loop instance based on the count of loop instances.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques of the present invention can provide substantial beneficial technical effects. For example, one or more embodiments provide one or more of:

improved performance of inner-loops of a program on multi-lane processors;

simpler design of processor front-end, reducing power and logic gates required in the front end, freeing them up to be used more advantageously elsewhere;

fewer processor cycles needed due to data dependency from lane-forward operations; and efficient maintenance of the register file state with reduced data broadcasts, i.e., simpler and hence higher performing register file design for the same number of logic gates.

These and other features and advantages of the present invention will become apparent from the following detailed description of illustrative embodiments thereof, which is to be read in connection with the accompanying drawings.

DETAILED DESCRIPTION

Figure 1:
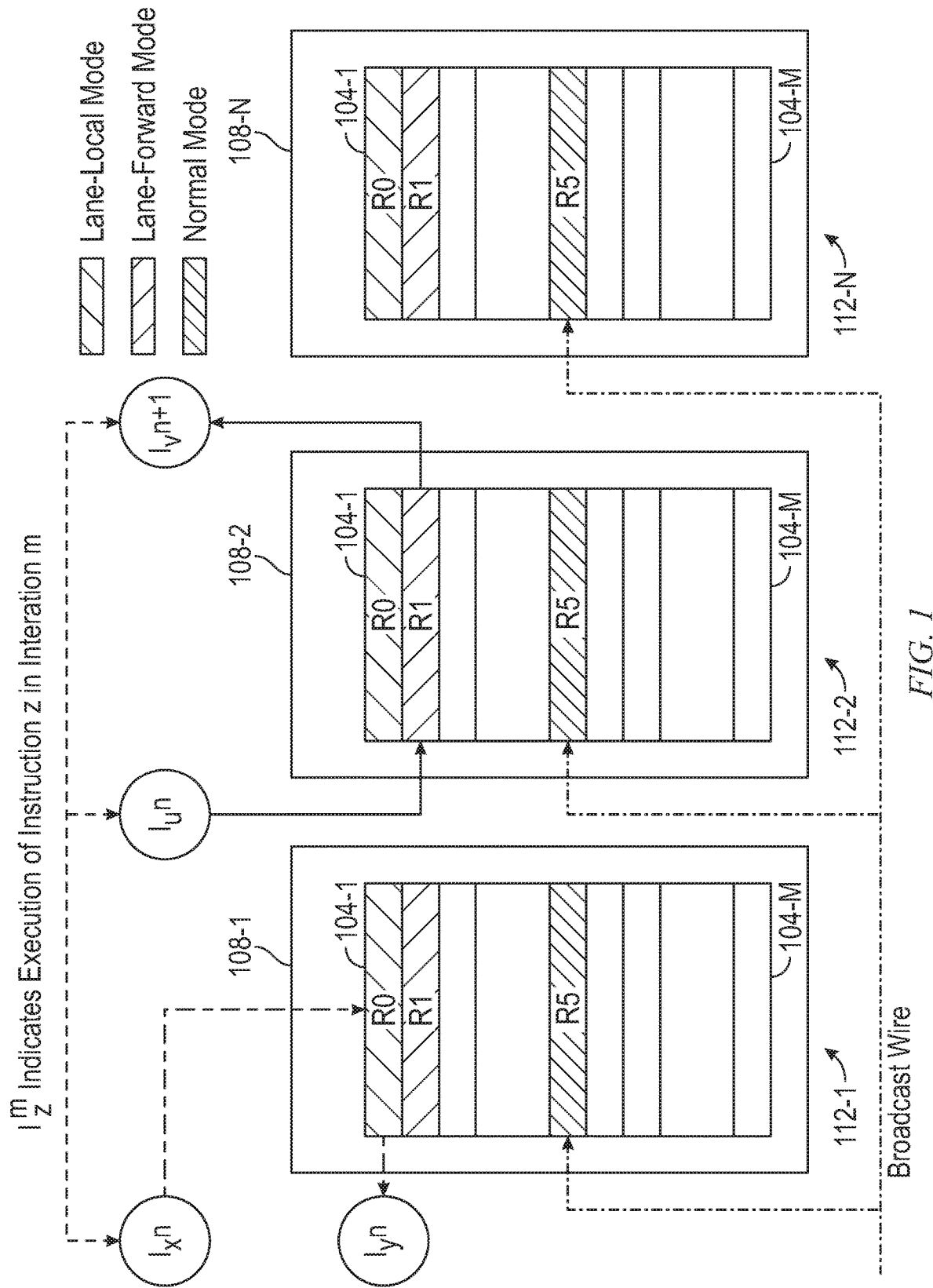
FIG. 1 illustrates a plurality of modes for registers of a plurality of register file copies, in accordance with an example embodiment.

Generally, methods, devices, and systems for enabling lanes of a processor to avoid the write-back (to all copies of a register file) of values specific to a particular iteration(s) of an inner loop is disclosed. In one example embodiment, successive iterations of an inner loop are mapped to successive lanes of a multi-lane processor core and a single instruction or internal operation (IOP) is broadcast to and interpreted by the multiple lanes of the processor. Each lane keeps a copy of the register file; the architected registers hold different values in each lane for values used only in an intra-loop-iteration and hold identical values across the lanes for the other variables.

In one example embodiment, a live-ness analysis of values is performed to restrict the write operations to a register of a single lane (in a lane-local and lane-forward mode, as described more fully below) and thereby reduce the number of values that are broadcast to registers of all lanes, resulting in an optimization of the broadcast of values (the normal mode) for write operations. A live-ness analysis, also known as a define-use analysis or def-use analysis, is an analysis of a program to determine all the instructions/locations in the program that can possibly use a value generated by a given instruction. If a value is to be written to registers of two different lanes, where def-use analysis cannot determine that a value is used only in the current lane or the next lane, one would either use the broadcast mode for that value, or the compiler would make two copies of the value where each copy is written to a register in a different mode. The analysis is performed by a compiler (at compile time) and/or a processor front-end (at run time). The broadcast instructions preserve all dependence manifest in architected control flow. No change is required in runtime semantics; sequential execution can be preserved. Broadcast instruction(s) result in compaction of the instruction sequence from the front-end of the processor to the lanes of the processor core.

In one conventional process, 1) each core gains control of a loop iteration; 2) each core has a strictly private copy of a register file and a common cache (L1); 3) the core can execute instructions that have unsatisfied control dependencies from other cores/threads, speculative execution of an iteration; 4) all loop iterations other than the oldest are speculative (i.e., they can be squashed without requiring recovery); and 5) speculative memory updates are confined to the common cache (L1) (merged with the L2 cache when they become non-speculative). Multiple threads are created from a single sequential thread, each thread executed on a different core (chip multi-processor, or CMP). In one example embodiment, the same instruction across loop iterations is fused into a vector-like instruction, run across multiple "lanes" in the processor core.

In one conventional process, speculative performance of loop iterations, with memory updates localized in the L1 common cache to enable undoing (squashing) the iterations (possible because each CMP has its own L1 cache). In one example embodiment, only instructions with satisfied control dependencies are performed. This results in simplified cross-lane register traffic.

In the conventional process, register values pulled from another processor running a prior iteration results in latency in obtaining the operands. In contrast, in one or more exemplary embodiments, register values are either broadcast or transferred from an adjacent lane.

FIG. 1 illustrates a plurality of modes for architected registers 104-1 . . . 104-M (known collectively as architected registers 104 and registers 104 herein) of a plurality of copies of the register file (referred to as register file copies 108-1, 108-2 . . . 108-N (known collectively as register file copies 108 herein), in accordance with an example embodiment. A mode may be selected for each architected register 104, and accordingly its replica in the register file copies 108. In a lane-local mode, the data results produced in a lane 112-1, 112-2, . . . 112-N (known collectively as lanes 112 herein) are kept locally in a register 104 of that lane 112. In a lane-forward mode, the data results produced in a lane 112 are stored locally in a register 104 of the next lane 112 without requiring materialization (storage) in the register file 108 of the lane 112 producing the value. In a normal (broadcast) mode, the data results produced in any lane 112 are copied (broadcast) to the register files 108 of all lanes 112. Variables modified conditionally in an iteration are broadcast to registers 104 via the normal mode.

Figure 2:
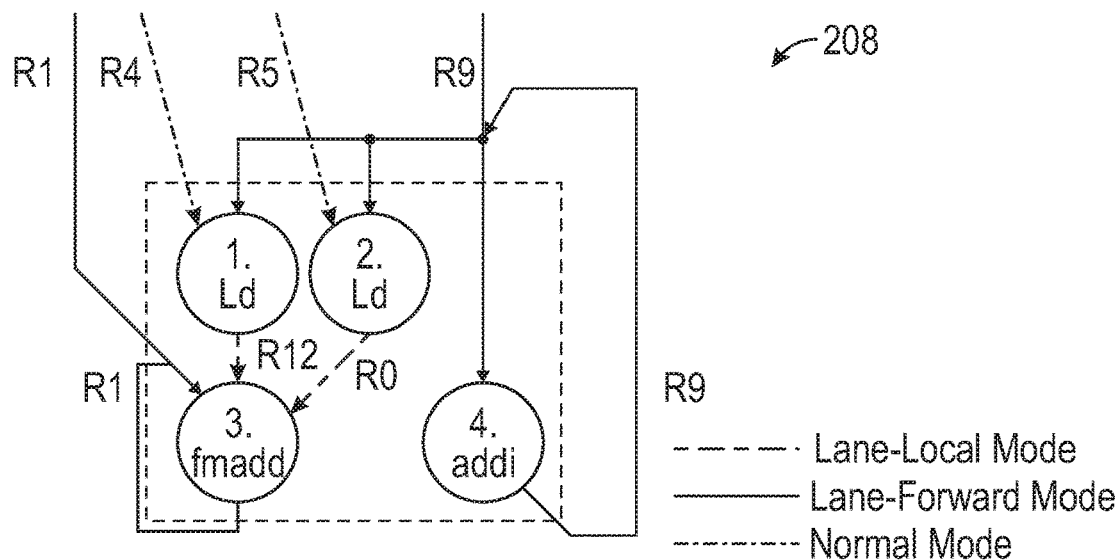
FIG. 2 illustrates an example of processing an inner loop of a program, in accordance with an example embodiment.

FIG. 2 illustrates an example of processing an inner loop of a program 200, in accordance with an example embodiment. Program 200 derives the inner product of two vectors, A and B. The program 200 has been compiled into code 204 which lists the machine-level instructions. As depicted in the mapping 208 of the code 204, the utilized registers 104 are configured in the lane-local, lane-forward, or normal mode. In one example embodiment, values with live-ness scope that are confined to use within the iteration of the loop that produced the value are stored in registers 104, such as R0 and R12, configured for the lane-local mode. Since each lane 112 corresponds to an iteration of the inner-loop, values defined in one iteration and used exclusively in the next iteration are stored in registers 104, such as R1 and R9, configured for the lane-forward mode, that is, they are stored only in the registers 104 of the next lane 112 (for use in the next iteration of the inner loop). Registers 104 for all other values, such as R4 and R5, are stored in registers 104 configured in the normal (broadcast) mode. Values can be copied between two architected registers 104 of different modes.

Figure 3:
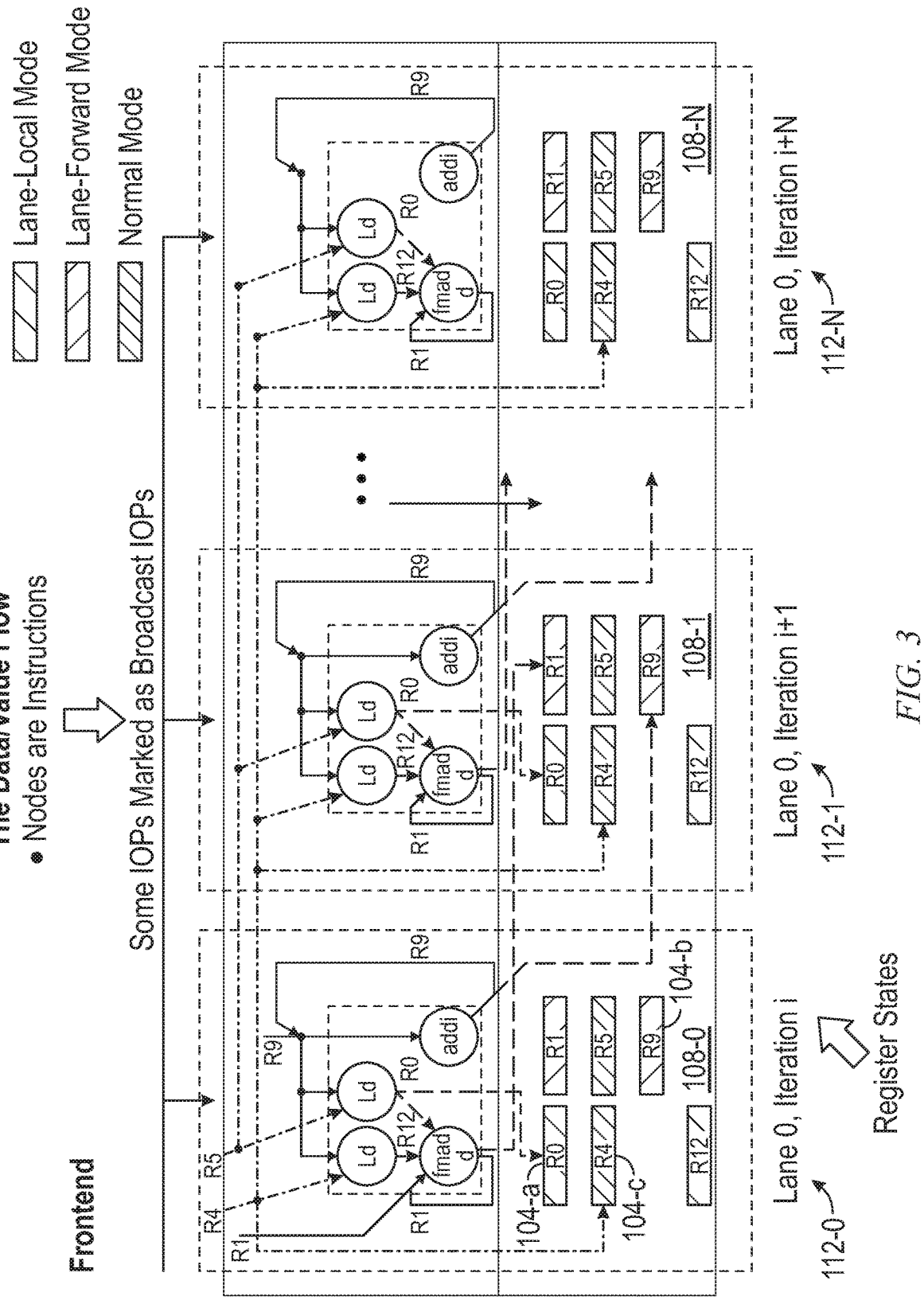
FIG. 3 illustrates an example mapping of the inner-loop of FIG. 2 to the lanes of an example processor core, in accordance with an example embodiment.

FIG. 3 illustrates an example mapping of the inner-loop of FIG. 2 to the lanes 112 of an example processor core, in accordance with an example embodiment. A common set of instructions are broadcast from the front-end in a single instruction, multiple data (SIMD) like manner. (The front-end of the processor broadcasts a sequence of IOPS to multiple lanes 112 of the processor; FIG. 3 illustrates a lane 112-0 as well.) Each lane 112 runs the IOPs for a different iteration of the inner-loop. In essence, the lanes 112 are running ultra-light threads, each ultra-light thread corresponding to an iteration of the inner loop. Processing progresses asynchronously, that is, the functional units of a lane 112 perform their assigned task as soon as the input data is available. While the register state is generally consistent across all lanes 112, it will differ for the registers 104 configured in the lane-local and lane-forward modes.

As illustrated in FIG. 3, a loop having an index i runs for N iterations, from i=0 to i=N−1. The values in the registers 104 labeled R4 and R5 are used as base addresses of arrays A and B in the program of FIG. 2 to load the registers 104 labeled R12 and R0, respectively, of all register files 108 (FIG. 3 illustrates a register file 108-0 as well) and are therefore configured in the normal (broadcast) mode. The values in the registers 104 labeled R0 and R12 are utilized by the 'fmadd' operation in only the lane 112 producing the product term being added to 'sum' and are therefore configured in the lane-local mode. The values in the registers 104 labeled R1 and R9 are the result of one iteration of the loop that is utilized in only the next iteration (by the lane 112 consuming the value) and are therefore configured in the lane-forward mode. For example, the data result of the first iteration in lane 112-1 is stored in the register 104 labeled R1 of lane 112-2 via the lane-forward mode (This is the running value of variable sum). The index, or offset into arrays A and B, produced in the first iteration in lane 112-1 is stored in the register 104 labeled R9 of lane 112-2 via the lane-forward mode.

Hardware-Only Solution

In one example embodiment, the front-end of the processor identifies multiple instruction groups as being instances of an inner loop and encodes them as a single group of IOPs that are to be broadcast to multiple lanes 112 of the processor using fusion tags, as described more fully below. Fusion tags are also discussed in U.S. patent application Ser. No. 16/205,208 of Manoj Kumar et al., entitled REFORMATTING MATRICES TO IMPROVE COMPUTING EFFICIENCY, filed Nov. 29, 2018, the complete disclosure of which is hereby expressly incorporated by reference herein in its entirety for all purposes. Each lane 112 then runs a different iteration of the inner loop.

In one example embodiment, the mode (lane-local, lane-forward, or normal) of the registers 104 are configured utilizing the set of IOPS. IOPs are also issued to create extra internal copies of the register data that is needed to support the data propagation techniques, such as forwarding data used in subsequent iterations of an inner loop. For example, for a generated value that is used in both a current iteration (producing lane 112) and a next iteration (consuming lane 112), a copy should be made from a lane-local register 104 to a lane-forward register 104. For example, if the expression for the sum in FIG. 2 were:

sum+=$A[i]$+$B[i+1]$;

then the new value of offset created in one lane would be used in both the current lane and the next lane, and hence a copy would be needed.

Figure 4:
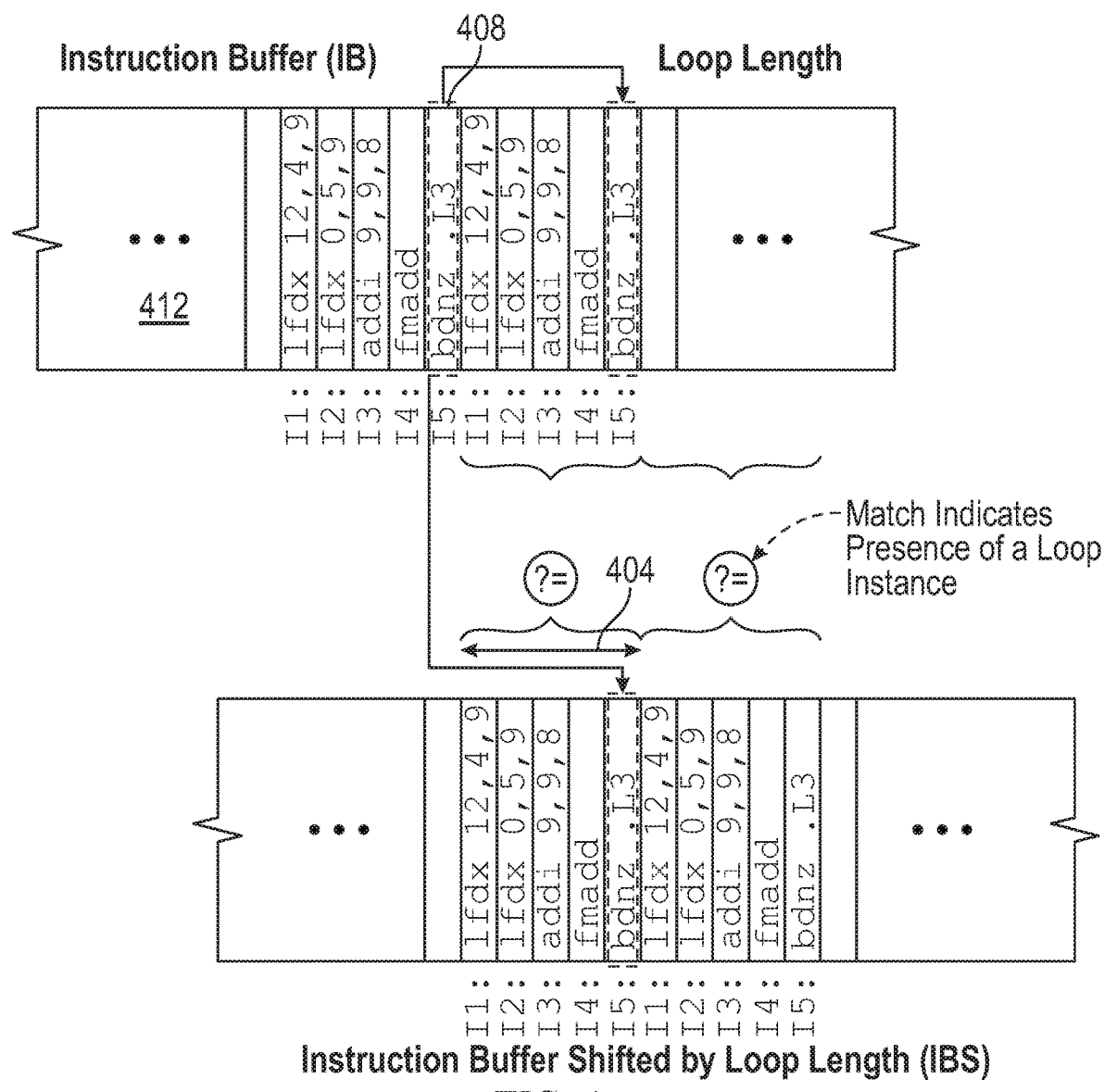
FIG. 4 illustrates an example technique for determining a count of loop instances in a loop of a program present in an instruction buffer (IB), in accordance with an example embodiment.

FIG. 4 illustrates an example technique for determining a count of loop instances in a loop of a program 400 present in an instruction buffer (IB) 412, in accordance with an example embodiment. In one example embodiment, a loop length 404 is computed by taking the first branch instruction 408 in the D3 412 and finding the distance to the next instruction with a matching instruction address. The number of loop instances in the instruction buffer 412 is determined by matching the instruction addresses in the D3 412 with contents of the D3 412 shifted by the loop length 404 and dividing the length of the matching subsequence by the loop length 404, and adding one to it. For example, let the loop length be n, and the length of maximum matching sequence be m=k*n+x. Dividing m by n and adding 1 to it gives k+1. For any integer j, $0<j<<k$, the $j+1^{st}$ set of n instructions in the original instruction sequence is the same as the $j^{th}$ set of n instructions in the shifted sequence, and hence equal to the $(j+1)^{st}$ set of n instructions in the original sequence. Hence, there are k repeats of the first set of n instructions in the original sequence, making the total number of loops equal to k=1.

In one example embodiment, after the instructions are fetched, branches within the program are analyzed: only consecutive instances of a backward branch instruction with a known count, such as bdz and bdnz, are considered. (Other implementations are possible.) Only the first K, such as 2 to 4, branches need to be considered to find the repeating branch instruction (same instruction address). The length of the loop is determined by the distance between two consecutive instances of the same branch instruction. To identify and to count the loop repetitions contained in the instruction stream, contents of the instruction buffer are shifted by the branch length and compared. In this way, the number of instructions managed by the instruction sequencing unit is reduced, as illustrated in FIG. 4.

Compiler Assist Solution

In one example embodiment, instances of an inner loop are similarly identified by analysis during the compile time for a program and passed on to the processor as stipulated in the aforementioned U.S. patent application Ser. No. 16/205,208 of Manoj Kumar et al.

Figure 5A:
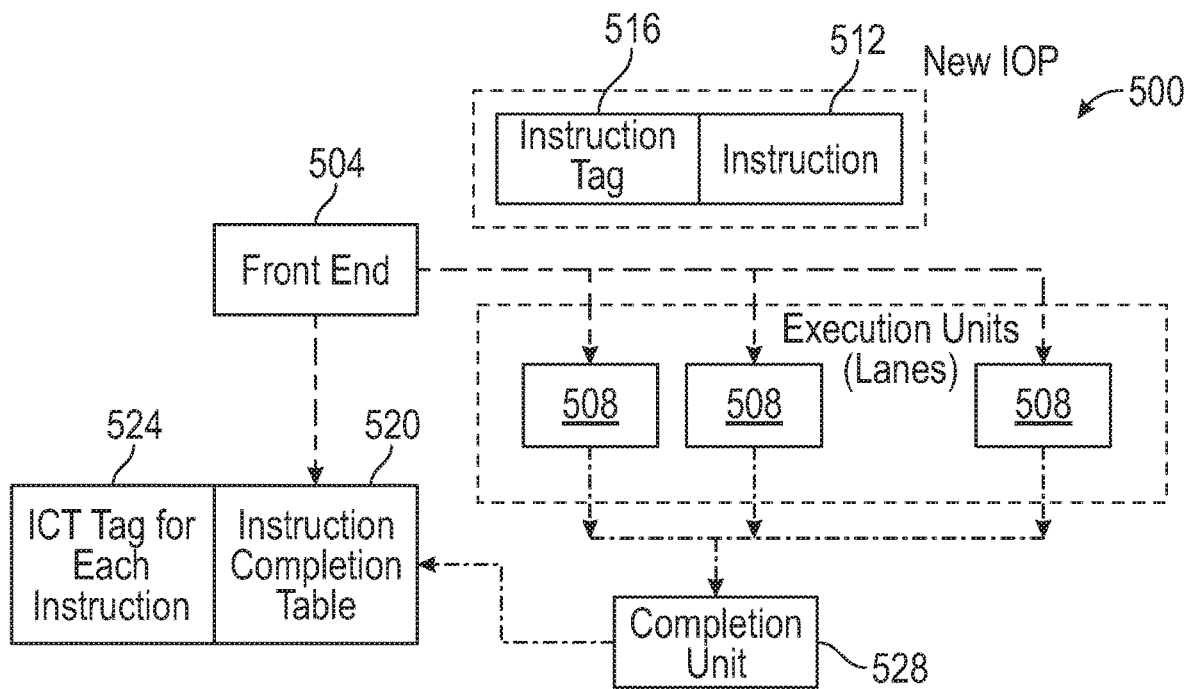
FIG. 5A presents a first example diagram illustrating the dispatching of instructions from a front-end of a processor to back-end functional units, in accordance with an example embodiment.

FIG. 5A presents a first example diagram 500 illustrating the dispatching of instructions 512 from a front-end 504 of a processor to back-end functional units 508, in accordance with an example embodiment. In one example embodiment, an instruction tag 516 (a single bit) accompanies each instruction (or IOP) 512 from the front-end 504 to the back-end functional units 508 indicating whether the instruction 512 is being broadcast to all lanes 112. The instruction tag 516 could also be a mask indicating which lanes 112 are to perform the broadcast instruction 512.

An instruction completion table (ICT) 520 is used by processors that support out of order instruction execution. Instructions can "finish" their computation out of order, but are marked as complete in their normal sequence using the ICT 520. The instruction completion table 520 is augmented with an ICT tag 524 for each instruction 512 that is resident in the ICT 520. The ICT tag 524 is a count of the lanes 112 that received the broadcast instruction 512. As the functional units 508 "finish" the performance of each instruction 512 broadcast from the front-end 504, the corresponding count is decremented by a completion unit 528. When the ICT tag 524 entry becomes zero, the instruction 512 is retired from the ICT 520.

Figure 5B:
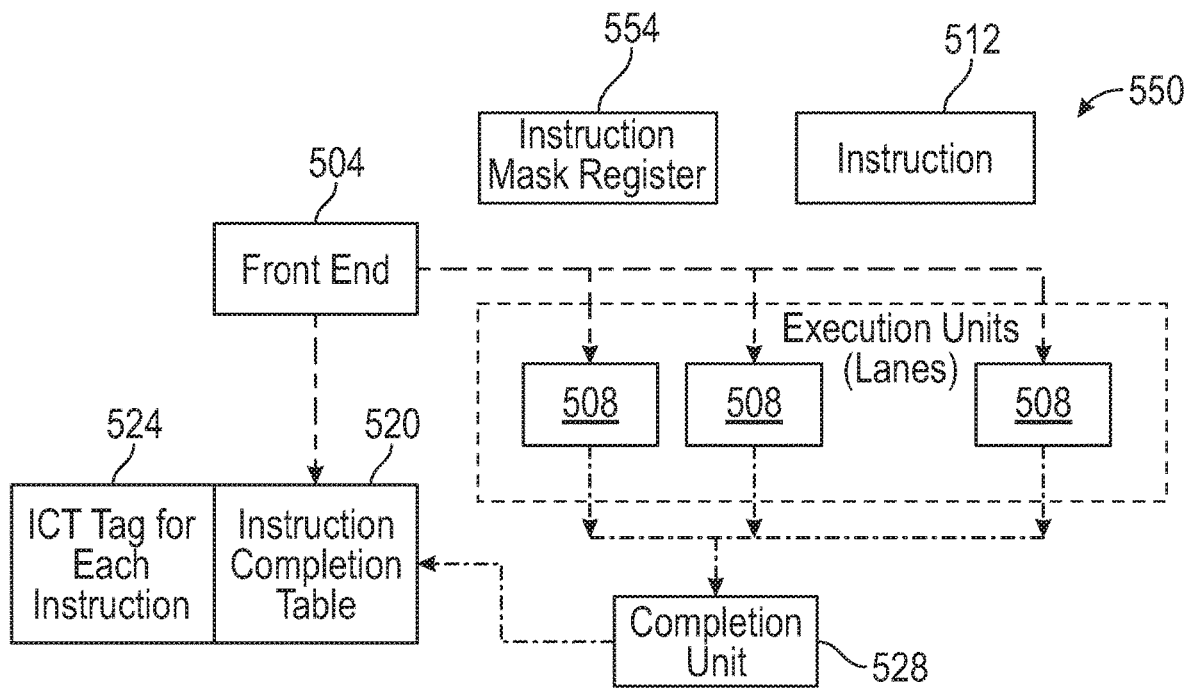
FIG. 5B presents a second example diagram illustrating the dispatching of instructions from a front-end of a processor to back-end functional units, in accordance with an example embodiment.

FIG. 5B presents a second example diagram 550 illustrating the dispatching of instructions 512 from a front-end 504 of a processor to back-end functional units 508, in accordance with an example embodiment. The second diagram 550 is similar to the first diagram of FIG. 5A, except an instruction mask register 554 is used in lieu of the instruction tag 516. In one example embodiment, the bits of the instruction mask register 554 indicate the subset of the plurality of functional units 508 that are to perform the dispatched instruction 512. The instruction mask register 554 is set by the IOP sent by the front-end 504. Elements 520, 524, and 528 are similar to those in FIG. 5A.

Figures 6A, 6B:
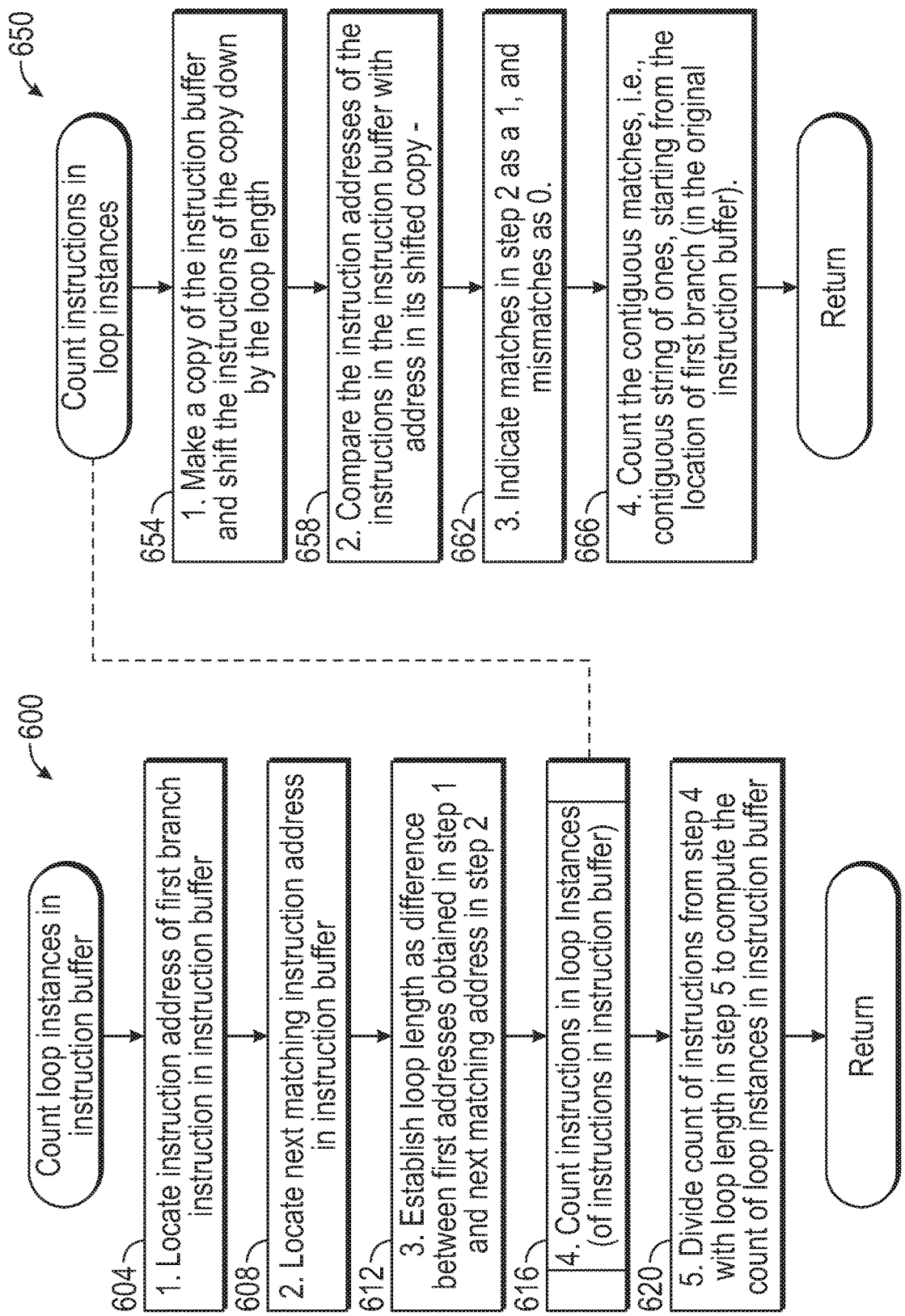
FIG. 6A illustrates an example method for determining a count of loop instances present in an instruction buffer, in accordance with an example embodiment.
FIG. 6B illustrates an example method for determining a count of instructions in a loop instance present in an instruction buffer, in accordance with an example embodiment.

FIG. 6A illustrates an example method 600 for determining a count of loop instances present in an instruction buffer 412, in accordance with an example embodiment. In one example embodiment, the instruction address of the first branch instruction 408 in the instruction buffer 412 is located (operation 604). The address of the next matching instruction in the instruction buffer 412 is located (operation 608). The loop length 404 is established as the difference between the first address obtained in operation 604 and the next matching address in operation 608 (operation 612). The instructions 512 in the loop instances (of the instructions 512 in the instruction buffer 412) are counted (operation 616), as described more fully below in conjunction with FIG. 6B. The count of instructions 412 from operation 616 is divided by the loop length 404 from operation 612, and then incremented by 1 (incrementing omitted from flow chart to avoid clutter), to compute the count of loop instances (iterations) in the instruction buffer 412 (operation 620).

FIG. 6B illustrates an example method 650 for determining a count of instructions 412 in a loop instance present in an instruction buffer 412, in accordance with an example embodiment. In one example embodiment, a copy of the instruction buffer 412 is made and the instructions 512 of the copy are shifted down by the loop length 404 (operation 654). The instruction addresses of the instructions 512 in the instruction buffer 412 are compared with the address in the shifted copy (operation 658). The matches in operation 658 are labeled as a one and the mismatches in operation 658 are labeled as a zero (operation 662). The contiguous matches are counted, that is, the contiguous strings of ones are counted, starting from the location of the first branch instruction 408 in the original instruction buffer 412 (operation 666).

In a non-limiting example, an improvement such as one cycle reduction from three or four cycles latency is obtained, for back-to-back dependent operations. The efficient execution of the back-to-back dependent operations is obtained from the efficient register file usage of a multi-lane processor as described herein.

Given the discussion thus far, it will be appreciated that, in general terms, an exemplary processor core, according to an aspect of the invention, comprising a plurality of lanes 112, each lane 112 comprising a copy of a register file 108 logically shared across the plurality lanes 112 and a plurality of functional units 508, at least two of the functional units 508 sharing a common cache and a common control unit, where: the common control unit concurrently dispatches multiple consecutive instances of an instruction 512 corresponding to multiple successive instances of an inner loop to the plurality of functional units 508 of at least a proper subset of the plurality of lanes 112; and one or more registers 104 of each copy of the register file 108, each register 104 being configurable to write a data result from at least one of the functional units 508 to a register 104 of a same lane 112 in a lane-local mode, to write the data result to a register 104 of a next lane 112 in a lane-forward mode, and to write a data result to corresponding registers 104 of all of the lanes 112 of the proper subset of the plurality of lanes 112 in a normal mode.

In one example embodiment, the dispatched instructions 512 are performed asynchronously by the corresponding functional units 508 based on readiness of input operands of the instruction 512. In one example embodiment, the processor core further comprises one or more instruction mask registers 554 in lieu of instruction tag 516 for selecting a subset of the plurality of functional units 508 to perform the dispatched instruction 512. In one example embodiment, a value defined and used only in one iteration of the inner loop that produced the value is stored in a lane-local register 104-*a* (as shown in FIG. 3), the lane-local register 104-*a* being configured for the lane-local mode; a value defined in a first given iteration of the inner loop and used only in a next iteration of the inner loop is stored in a lane-forward register 104-*b*, the lane-forward register 104-*b* being configured for the lane-forward mode; and a value defined in a second given iteration of the inner loop and used in a plurality of other iterations of the inner loop is stored in a normal register 104-*c*, the normal register 104-*c* being configured for the normal mode.

In one example embodiment, an instruction tag 516 accompanies each instruction 512 or IOP and indicates that the corresponding instruction 512 is being broadcast to all of the plurality of lanes 112. In one example embodiment, the instruction tag 516 acts as a mask indicating which of the plurality of lanes 112 are to perform the broadcast instruction 512. In one example embodiment, an instruction completion table (ICT) 520 indicates the instructions 512 which are complete and an ICT tag 524 indicates a count of lanes 112 that received the corresponding instruction 512. In one example embodiment, the count in the ICT 520 of lanes 112 that received the instruction 512 is decremented each time a performance of the corresponding broadcast instruction 512 is completed by one of the plurality of lanes 112.

In one aspect, a method of performing an inner loop on a processor core comprises: dispatching an instruction 512 simultaneously to one or more functional units 508 of at least a proper subset of lanes 112 of the processor core, each lane 112 having a copy of a register file 108 logically shared across the plurality of lanes 112; and configuring one or more registers 104 of each copy of the register file to write a data result from at least one functional unit 508 to one of the registers 104 of a same lane 112 in a lane-local mode, to write the data result to a register 104 of a next lane 112 in a lane-forward mode, or to write the data result to corresponding registers 104 of all lanes 112 of the proper subset of the lanes 112 in a normal mode.

In one example embodiment, one or more instruction mask registers 554 are configured to select a subset of functional units 508 to perform the dispatched instruction 512. In one example embodiment, an instruction tag 516 accompanies each instruction 512 or IOP sent from a front-end 504 to back-end functional units 508 indicating that the instruction 512 is being broadcast to all of the plurality of lanes 112.

In one aspect, a method of determining a count of loop instances present in an instruction buffer 412 comprises: locating a first instruction address of a first branch instruction 512 in the instruction buffer 412 (operation 604); locating an address of a next matching instruction in the instruction buffer 412 (operation 608); establishing a loop length as a difference between the first instruction address and the address of the next matching instruction 512 (operation 612); counting instructions 512 in one of the loop instances (operation 616) (the counting of instructions 512 comprising: making a copy of the instruction buffer 412 (operation 654); shifting down one or more instructions 512 of the copy by a loop length (operation 654); comparing instruction addresses of instructions 512 in the instruction buffer 412 with the shifted instruction addresses in the shifted copy (operation 658); labeling matches from the comparison as a one and labeling mismatches from the comparison as a zero (operation 662); and counting contiguous strings of ones in the labels starting from a location of a first branch instruction 512 in the instruction buffer 412 (operation 666)); dividing the count of instructions 512 in the loop instance by the loop length and adding 1 to the result to compute the count of loop instances (operation 620); and configuring a lane 112 of a processor core for each loop instance based on the count of loop instances.

Figure 7:
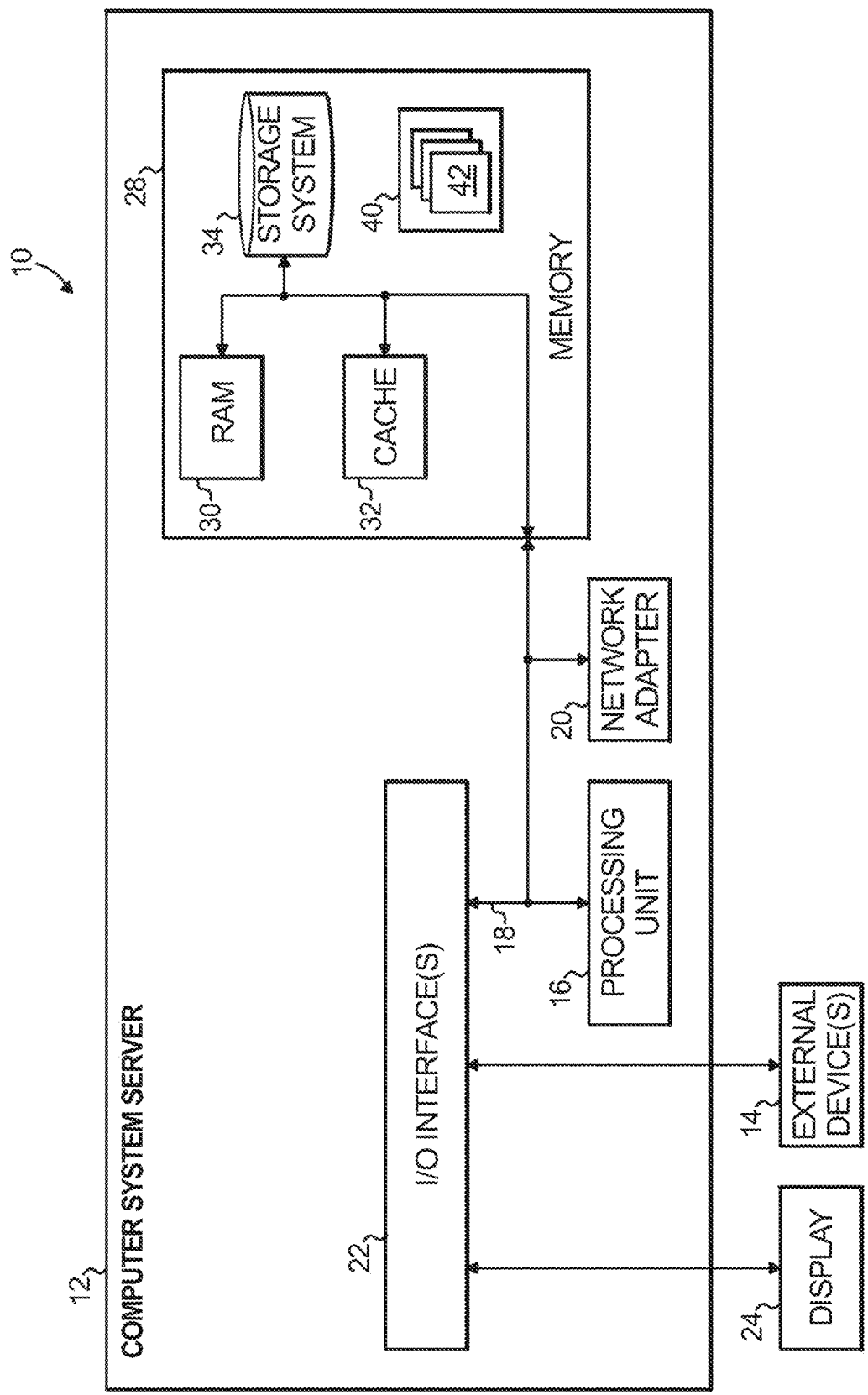
FIG. 7 depicts a computer system that may be useful in implementing one or more aspects and/or elements of the invention.

One or more embodiments of the invention, or elements thereof, can be used in a computer including a memory and at least one processor that is coupled to the memory. FIG. 7 depicts a computer system that may be useful in implementing one or more aspects and/or elements of the invention.

In node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out appropriate functions.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out functions and/or methodologies.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can be used, for example, on a processor of a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

The following discussion "Exemplary System and Article of Manufacture Details" provides background information on operation of a general purpose computer having one or more processors in which aspects of the invention can be implemented and should be understood in that context.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor core comprising:
a plurality of lanes, each lane comprising a copy of a register file logically shared across the plurality of lanes and a plurality of functional units, each copy of the register file having one or more registers, at least two of the functional units sharing a common cache and a common control unit, where:
the common control unit concurrently dispatches multiple consecutive instances of an instruction corresponding to multiple successive instances of an inner loop to the plurality of functional units of at least a proper subset of the plurality of lanes; and
each register is configurable to write a data result from at least one of the functional units to a register of a same lane in a lane-local mode, to write the data result to a register of a next lane in a lane-forward mode, and to write a data result to corresponding registers of all of the lanes of the proper subset of the plurality of lanes in a normal mode.

2. The processor core of claim 1, wherein the dispatched instructions are performed asynchronously by the corresponding functional units based on readiness of an input operand of the instruction.

3. The processor core of claim 2, the processor core further comprising one or more instruction mask registers for selecting a subset of the plurality of functional units to perform the dispatched instruction.

4. The processor core of claim 1, wherein a value defined and used only in one iteration of the inner loop that produced the value is stored in a lane-local register, the lane-local register being configured for the lane-local mode; wherein a value defined in a first given iteration of the inner loop and used only in a next iteration of the inner loop is stored in a lane-forward register, the lane-forward register being configured for the lane-forward mode; and wherein a value defined in a second given iteration of the inner loop and used in a plurality of other iterations of the inner loop is stored in a normal register, the normal register being configured for the normal mode.

5. The processor core of claim 1, wherein an instruction tag accompanies each instruction or IOP and indicates that the corresponding instruction is being broadcast to all of the plurality of lanes.

6. The processor core of claim 5, wherein the instruction tag acts as a mask indicating which of the plurality of lanes are to perform the broadcast instruction.

7. The processor core of claim 5, wherein an instruction completion table (ICT) indicates the instructions which are complete and an ICT tag indicates a count of lanes that received the corresponding instruction.

8. The processor core of claim 7, wherein the count in the ICT of lanes that received the instruction is decremented each time a performance of the corresponding broadcast instruction is completed by one of the plurality of lanes.

9. A method of performing an inner loop on a processor core, the method comprising:
dispatching an instruction simultaneously to one or more functional units of at least a proper subset of lanes of the processor core, each lane having a copy of a register file logically shared across the plurality of lanes;
configuring one or more registers of each copy of the register file to write a data result from at least one functional unit to one of the registers of a same lane in a lane-local mode, to write the data result to a register of a next lane in a lane-forward mode, or to write the data result to corresponding registers of all lanes of the proper subset of the lanes in a normal mode; and
performing the instruction via the one or more functional units.

10. The method of claim 9, wherein the dispatched instruction is performed asynchronously based on readiness of an input operand of the instruction.

11. The method of claim 10, wherein one or more instruction mask registers are configured to select a subset of functional units to perform the dispatched instruction.

12. The method of claim 9, wherein a value defined and used only in an iteration of the inner loop that produced the value is stored in a lane-local register, the lane-local register being configured for the lane-local mode; wherein a value defined in a first given iteration of the inner loop and used only in a next iteration of the inner loop is stored in a lane-forward register, the lane-forward register being configured for the lane-forward mode; and wherein a value defined in a second given iteration of the inner loop and used in a plurality of other iterations of the inner loop is stored in a normal register, the normal register being configured for the normal mode.

13. The method of claim 9, wherein an instruction tag accompanies each instruction or IOP sent from a front-end to back-end functional units indicating that the instruction is being broadcast to all of the plurality of lanes.

14. The method of claim 13, wherein the instruction tag acts as a mask indicating which of the plurality of lanes are to perform the broadcast instruction.

15. The method of claim 9, wherein an instruction completion table (ICT) indicates the instructions which are complete and an ICT tag indicates a count of lanes that received the corresponding instruction.

16. The method of claim 15, wherein the count in the ICT of lanes that received the instruction is decremented each time a performance of the corresponding broadcast instruction is completed by one of the plurality of lanes.

17. A method for determining a count of loop instances present in an instruction buffer, the method comprising:
  locating a first instruction address of a first branch instruction in the instruction buffer;
  locating an address of a next matching instruction in the instruction buffer;
  establishing a loop length as a difference between the first instruction address and the address of the next matching instruction;
  counting instructions in one of the loop instances, the counting of instructions comprising:
    making a copy of the instruction buffer;
    shifting down one or more instructions of the copy by a loop length;
    comparing instruction addresses of instructions in the instruction buffer with the shifted instruction addresses in the shifted copy;
    labeling matches from the comparison as a one and labeling mismatches from the comparison as a zero; and
  counting contiguous strings of ones in the labels starting from a location of a first branch instruction in the instruction buffer;
  dividing the count of instructions in the loop instance by the loop length and adding one to the result to compute the count of loop instances;
  configuring a lane of a processor core for each loop instance based on the count of loop instances; and
  performing the first instruction via the processor core.

18. The method of claim 17, the method further comprising configuring one or more registers of each copy of a register file of each lane of the processor core to write a data result from at least one functional unit to one of the registers of a same lane in a lane-local mode, to write the data result to a register of a next lane in a lane-forward mode, or to write the data result to corresponding registers of all lanes of the proper subset of the lanes in a normal mode.

19. The method of claim 17, wherein the first instruction is performed asynchronously based on readiness of an input operand of the first instruction.

20. The method of claim 17, wherein one or more instruction mask registers are configured to select a subset of functional units to perform the first instruction.

* * * * *